Patented Aug. 10, 1948

2,446,981

UNITED STATES PATENT OFFICE 2,446,981

ALUMINUM HYDROXIDE ANTACID COMPOSITION

Frederick Constant Ninger, Flushing, N. Y., assignor to Vick Chemical Company, New York, N. Y., a corporation of Delaware No Drawing. Application December 6, 1945, Serial No. 633,274

5 Claims. (Cl. 167—55)

This invention relates to improved antacid compositions derived from aluminum hydroxide for the treatment of excessive gastric acidity. These compositions may be in the form of liquids, powders or tablets. They have the property of rapidly neutralizing the stomach contents to the desired pH range of 2.5 to about 4.0 and maintaining it there for a prolonged period of time. In addition to this valuable therapeutic property, the new compositions have marked advantages in that they may have a decreased bulk as compared with other antacids and have a bland taste and hence are more palatable than the usual antacid products containing aluminum hydroxide.

The new products of the invention are reaction products of aluminum hydroxide and one or more salts of a lower aliphatic hydroxy acid or acids. Aluminum hydroxide in various forms has been commonly used in antacid preparations. The hydroxide itself provides adjustment of the gastric acidity to the pH range of 2.5 to 4.0, but frequently takes a considerable period of time to accomplish that result. When compounded with a salt of a lower aliphatic hydroxy acid in accordance with the present invention, aluminum hydroxide yields a product which accomplishes the same adjustment of gastric acidity but in a very much shorter period of time.

The new products of the invention may be prepared by admixture of aluminum hydroxide, usually in the form of the commercially available dried gel, although other forms, e. g., freshly prepared gel in liquid form, may be used, with an aqueous solution of a salt of a lower aliphatic hydroxy acid. The proportions of aluminum hydroxide and the salt may be varied over a relatively wide range. The products having most favorable characteristics result from the use of aluminum hydroxide and the salt of the lower aliphatic hydroxy acid in molecular proportions ranging from about 1:1 to about 1:⅛. Increased proportions of the salt of the lower aliphatic hydroxy acid may be used, but in general offer little or no advantage. Smaller proportions of the salt than are included in this range may also be used, but with them there is sacrifice of the increased rate of adjustment of gastric acidity.

The products of the invention may be prepared in the form of liquids, powders or tablets, and may be compounded with other materials, including other antacid materials, such as magnesium trisilicate, calcium carbonate, magnesium carbonate, additional aluminum hydroxide gel, etc. and also may be compounded with flavoring materials and binding agents. The dosage level of the new products is approximately the same as that commonly used with aluminum hydroxide preparations, based on the aluminum hydroxide content.

Among the salts of lower aliphatic hydroxy acids which may be used in preparing the new products are sodium citrate, potassium citrate, potassium sodium tartrate (Rochelle salts), potassium acid tartrate (cream of tartar) calcium gluconate, lithium lactate, and sodium malate, as well as other non-toxic water soluble salts of lower aliphatic hydroxy acids. Mixtures of such salts may be used.

The invention will be illustrated by the following examples but it is not limited thereto.

*Example I.*—282.2 parts of potassium sodium tartrate (Rochelle salts) having four molecules of water of crystallization are disssolved in 500 parts of distilled water previously heated to 75–85° C., 77.9 parts (an equimolar proportion) of aluminum hydroxide in the form of a commercially available dried gel is added to the hot solution with stirring. A syrupy, milky solution or suspension is produced. This is evaporated to dryness in an oven at 85° C., giving 285 parts of dried product (indicating the loss of the water of crystallization from the salt). The dried residue is milled or ground to a fine powder. The equivalent of one part of aluminum hydroxide in the form of this powder is admixed with two parts of dried aluminum hydroxide gel, suitable flavoring and binding ingredients are added, and the product is converted into tablets by compression in the usual way. These tablets, when administered for the adjustment of gastric acidity, rapidly bring about an adjustment to the pH range of 2.5 to 4.0 and maintain that pH for a prolonged period. Instead of converting the product to the tablet form it may be used in the form of a powder. The syrupy solution or suspension of the reaction product, without drying, but with simple concentration to the desired level, may be used in the form of a liquid preparation, with the addition of the aluminum hydroxide gel, flavoring agents, and the like.

*Example II.*—73.53 parts of sodium citrate, with two molecules of water of crystallization, is dissolved in 300 parts of distilled water previously heated to 75–85° C. 77.9 parts of aluminum hydroxide in the form of the commercially available dried gel is added to the hot solution with stirring. A milky solution or suspension forms which is poured into enameled trays and dried under ordinary infra-red heating lamps. The dried product is converted into a form for use in the manner described in Example I, except that additional aluminum hydroxide is not added, or without complete drying is available for use in the form of a liquid. When the product of this example is subjected to substantially complete drying, about 150 parts of the dried product are obtained indicating that the final product includes the two molecules of water of crystallization originally present in the sodium citrate.

*Example III.*—One part, calculated on its aluminum hydroxide content, of the reaction product of aluminum hydroxide and potassium sodium tartrate in equimolar proportions is dissolved in hot water and stirred until a viscous solution is obtained. Two parts of aluminum hydroxide, in the form of commercially available dried gel, one part of magnesium trisilicate and one part of calcium carbonate, and a suitable filler, such as corn starch, is then added. The mixture is granulated by forcing through a wire screen and dried at 60° C. A lubricant such as magnesium stearate or stearic acid is then added along with flavoring materials and the granules are compressed into tablets. Tablets of suitable size may contain three grains of aluminum hydroxide (total) and proportionate quantities of the other ingredients.

*Example IV.*—154.15 parts of calcium lactate, $Ca(C_3H_5O_3)_2 \cdot 5H_2O$, is dissolved in 250 parts of boiling distilled water. 77.9 parts of aluminum hydroxide, in the form of commercially available dried gel, is added to the hot solution of the calcium lactate with stirring. The milky solution formed is transferred to an enameled tray and dried in an oven at 80° C. The dried product is reduced to a fine powder by milling. The weight of the dried product before milling is 185 parts, corresponding to the loss of the water of crystallization of the calcium lactate.

I claim:

1. An improved aluminum hydroxide antacid composition including the reaction product of aluminum hydroxide and a water soluble salt of a lower aliphatic hydroxy acid heated together in an aqueous medium and further characterized by an accelerated neutralization reaction time for gastric juice relative to that of unreacted aluminum hydroxide.

2. An improved aluminum hydroxide composition including the reaction product of aluminum hydroxide and a water soluble salt of a lower aliphatic hydroxy acid heated together in an aqueous medium in the molar ratio range of 1:1 and 1:⅛, and further characterized by an accelerated neutralization reaction time for gastric juice relative to that of unreacted aluminum hydroxide.

3. An improved aluminum hydroxide antacid composition including the reaction product of aluminum hydroxide and potassium sodium tartrate heated together in an aqueous medium and further characterized by an accelerated neutralization reaction time for gastric juice relative to that of unreacted aluminum hydroxide.

4. An improved aluminum hydroxide antacid composition including a blend of aluminum hydroxide gel and the reaction product of aluminum hydroxide and a water soluble salt of a lower aliphatic hydroxy acid heated together in an aqueous medium, which composition is further characterized by an accelerated reaction time relative to that of unreacted aluminum hydroxide in neutralizing gastric juice to within the approximate pH range, 2.5 to 4.0.

5. An improved aluminum hydroxide antacid composition including a blend of aluminum hydroxide gel and the reaction product of aluminum hydroxide and potassium sodium tartrate heated together in an aqueous medium, which composition is further characterized by an accelerated reaction time relative to that of unreacted aluminum hydroxide in neutralizing gastric juice to within the approximate pH range, 2.5 to 4.0.

FREDERICK CONSTANT NINGER.

REFERENCES CITED

The following references are of record in the file of this patent:

UNITED STATES PATENTS

| Number | Name | Date |
| --- | --- | --- |
| 1,964,696 | Traube et al. | June 26, 1934 |

OTHER REFERENCES

Mellor, Inorganic & Theoretical Chemistry, vol. 5, page 279 (1924).

Merck's Index, 4th. ed. (1930), pages 62, 421, 422.

Doumanski, Bulletin Societe Chimique de France, 4th series, vol. 43, part 2 (Memoires 1928), pages 969 to 977 (pages 970, 972).